UNITED STATES PATENT OFFICE.

GEORG KOHL, OF VIENNA, AUSTRIA-HUNGARY, ASSIGNOR OF THREE-FIFTHS TO ARMIN BERGL, OF SAME PLACE, AND VICTOR VON THEUMER, OF MAUER, AUSTRIA-HUNGARY.

GLOW-BODY FOR INCANDESCENT BURNERS.

SPECIFICATION forming part of Letters Patent No. 623,723, dated April 25, 1899.

Application filed August 3, 1898. Serial No. 687,629. (No model.)

*To all whom it may concern:*

Be it known that I, GEORG KOHL, a subject of the Emperor of Austria-Hungary, residing at Vienna, in the Province of Lower Austria, in the Empire of Austria-Hungary, have invented certain new and useful Improvements in the Manufacture of Glow-Bodies for Incandescent Burners; and I do hereby declare the following to be a full, clear, and exact description of the invention, such as will enable others skilled in the art to which it appertains to make and use the same.

The glow-bodies or so-called "mantles" heretofore employed for illuminating purposes in incandescent or Bunsen burners are attended by the disadvantage that they possess little strength to withstand pressure, shock, draft, or contact with moist air or water and are therefore very liable to be damaged both during transport and while in use.

Now this invention relates to glow-bodies or mantles which while possessing an increased capacity for emitting light are so strong and elastic that they will not be easily damaged even by impact or repeated powerful shocks or by the pressure exerted in handling them.

The process for the manufacture of such mantles is carried out as follows: First, a solution is prepared by dissolving in one kilogram of water two grams of zinc nitrate, 1.2 grams of tin nitrate, one gram of bismuth nitrate, one gram of borax, and two grams of calcium nitrate. With this solution are impregnated nets or mantles produced from vegetable fiber, preferably cotton or ramie. After being dried at a high temperature they are impregnated by immersion in a second solution, produced by dissolving in one kilogram of water four hundred grams of thorium nitrate, two grams of cerium nitrate, (free from didymium,) 0.4 gram of barium nitrate, 3.2 grams of strontium nitrate, 0.12 gram of indium nitrate, 0.04 gram of gallium nitrate, and 0.24 gram of samarium nitrate. The mantles prepared after this manner are again rapidly dried and finally glowed for the purpose of incinerating the vegetable fiber and the absorbed impregnating salts.

In the glowing of course the salts of zinc, tin, and bismuth present with the salts of the rare earths are also incinerated—that is to say, converted into the corresponding oxids—and remain behind as such, and consequently serve to increase the mass of the skeleton of the glow-bodies under consideration, in consequence of which the said skeleton constitutes a much stronger and fireproof framework than the glow-bodies heretofore known. The addition of the nitrates of barium, strontium, indium, gallium, and samarium to those of thorium and cerium has the result that the capacity of the new glow-bodies for emitting light is considerably increased and is maintained constant, while the calcium salt, which remains behind in the form of lime after the glowing, and the borax serve as binding agents.

I claim—

1. In the manufacture of incandescible mantles, the process which consists in impregnating a combustible fabric with an aqueous solution of borax and nitrates of zinc, tin, bismuth and calcium, and after drying, with a solution of incandescible salts, again drying, and finally subjecting them to a sufficiently high temperature to destroy the base fabric and convert the described nitrates into oxids, for the purpose set forth.

2. In the manufacture of incandescible mantles, the process which consists in impregnating a vegetable fibrous fabric with an aqueous solution of borax and nitrates of zinc, tin, bismuth and calcium, and after drying, with a solution of nitrates of thorium, barium, iridium, strontium, indium, gallium, samarium and cerium, the latter free from didymium, and subjecting the mantles so prepared to a sufficiently high temperature to oxidize all the nitrates and to destroy the base fabric of vegetable fibers, for the purpose set forth.

3. An incandescible mantle having a base consisting of a compound of borax and oxids of tin, zinc, bismuth and calcium, coated with incandescible oxids of the rare earths, substantially as described.

4. An incandescible mantle having a base consisting of a compound of borax and oxids of tin, zinc, bismuth and calcium, coated with a mixture of oxids of thorium, barium, iridium, strontium, gallium, samarium and cerium, the latter free from didymium, substantially as described.

In testimony that I claim the foregoing as my invention I have signed my name in presence of two subscribing witnesses.

GEORG KOHL.

Witnesses:
HENRY C. CARPENTER,
ALVESTO S. HOGUE.